(12) United States Patent
Suzuki et al.

(10) Patent No.: US 9,080,653 B2
(45) Date of Patent: Jul. 14, 2015

(54) DRIVE APPARATUS

(71) Applicant: DENSO CORPORATION, Kariya, Aichi-pref. (JP)

(72) Inventors: Yasuyoshi Suzuki, Chiryu (JP); Yuuya Takahashi, Tokai (JP); Toshihiro Takahara, Kariya (JP)

(73) Assignee: DENSO CORPORATION, Kariya (JP)

( * ) Notice: Subject to any disclaimer, the term of this patent is extended or adjusted under 35 U.S.C. 154(b) by 13 days.

(21) Appl. No.: 14/086,251

(22) Filed: Nov. 21, 2013

(65) Prior Publication Data
US 2014/0137675 A1  May 22, 2014

(30) Foreign Application Priority Data

Nov. 21, 2012 (JP) .................................. 2012-255193
Apr. 3, 2013 (JP) .................................. 2013-077755

(51) Int. Cl.
F16H 53/00 (2006.01)
F16H 25/14 (2006.01)
F01L 13/00 (2006.01)
F16H 53/06 (2006.01)

(52) U.S. Cl.
CPC ................ F16H 25/14 (2013.01); F01L 13/00 (2013.01); F16H 53/06 (2013.01); Y10T 74/18296 (2015.01)

(58) Field of Classification Search
USPC .................... 74/55, 568 R, 567; 123/90.18
See application file for complete search history.

(56) References Cited

U.S. PATENT DOCUMENTS

| 2001/0023674 | A1 | 9/2001 | Shimizu et al. | |
|---|---|---|---|---|
| 2003/0000796 | A1* | 1/2003 | Kawai et al. | 192/223.2 |
| 2005/0120987 | A1* | 6/2005 | Inaba et al. | 123/90.16 |
| 2007/0266971 | A1* | 11/2007 | Bosl-Flierl et al. | 123/90.16 |

FOREIGN PATENT DOCUMENTS

| JP | 2004-339951 | 12/2004 |
|---|---|---|
| JP | 2006-312888 | 11/2006 |
| JP | 4025155 | 10/2007 |
| JP | 4141812 | 6/2008 |

OTHER PUBLICATIONS

Office Action (2 pages) dated Feb. 24, 2015, issued in corresponding Japanese Application No. 2013-077755 and English translation (3 pages).

* cited by examiner

Primary Examiner — Vicky Johnson
(74) Attorney, Agent, or Firm — Nixon & Vanderhye PC

(57) ABSTRACT

A drive cam is rotated about a camshaft member upon application a drive torque of a drive source to the drive cam. A transmission device converts rotational motion of the drive cam into linear reciprocating motion and transmits the converted linear reciprocating motion to a control shaft member. The control shaft member is connected to a controlled subject and is linearly reciprocated together with the transmission device in an axial direction. A reverse input cutoff clutch transmits the drive torque, which is received from the drive source, to the drive cam. The reverse input cutoff clutch non-rotatably locks an output shaft of the drive source in response to a reverser input torque transmitted from the controlled subject through the drive cam.

5 Claims, 11 Drawing Sheets

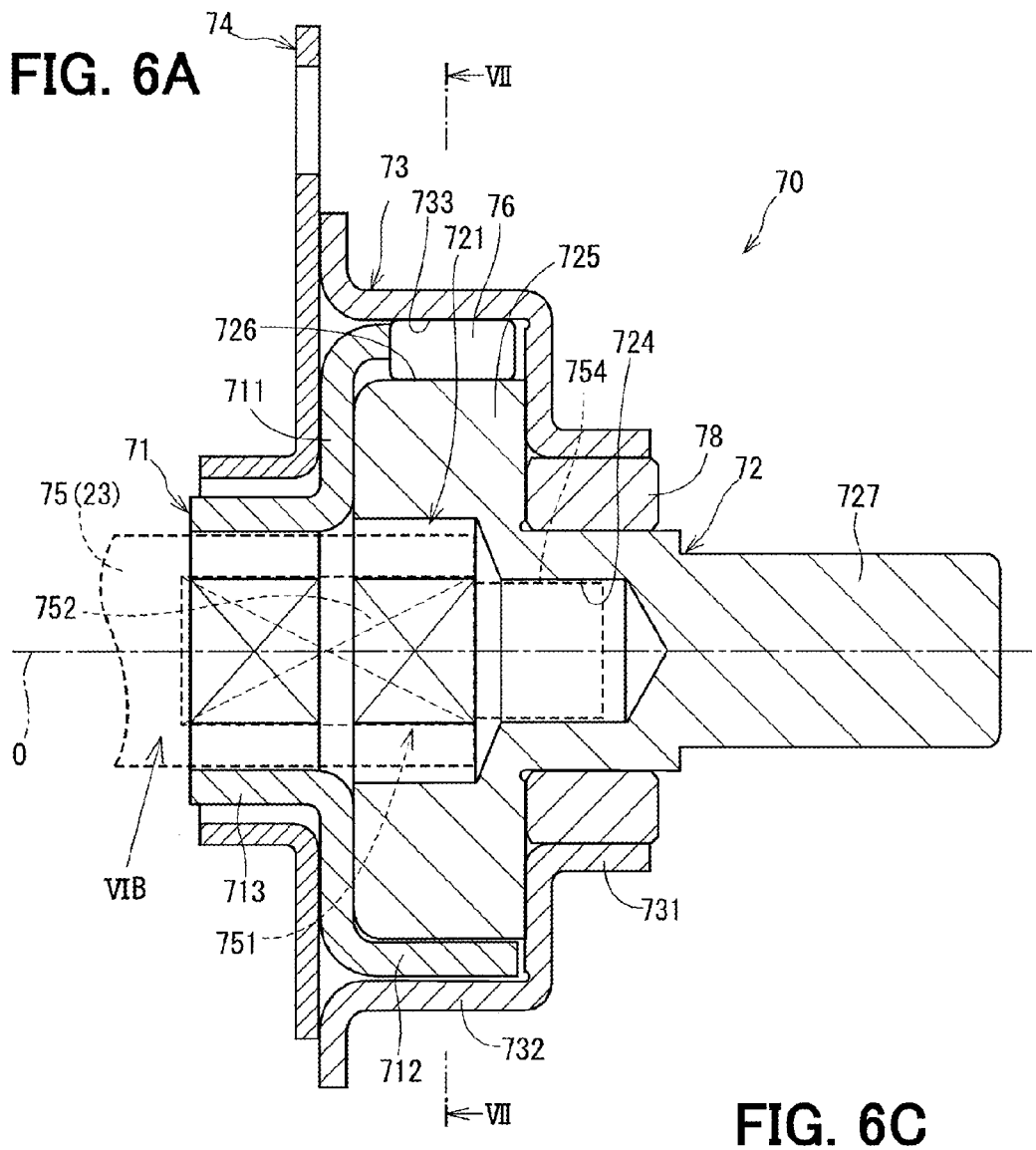
FIG. 6A
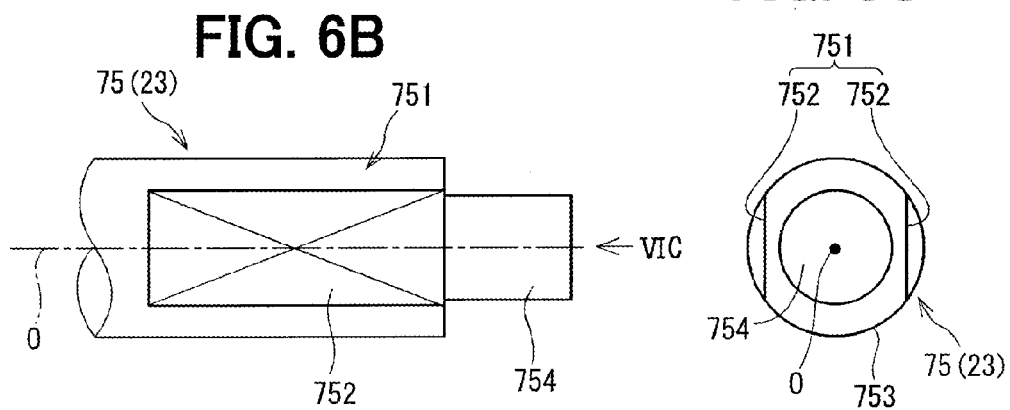
FIG. 6B
FIG. 6C

US 9,080,653 B2

DRIVE APPARATUS

CROSS REFERENCE TO RELATED APPLICATION

This application is based on and incorporates herein by reference Japanese Patent Application No. 2012-255193 filed on Nov. 21, 2012 and Japanese Patent Application No. 2013-77755 filed on Apr. 3, 2013.

TECHNICAL FIELD

The present disclosure relates to a drive apparatus, which adjusts a controlled variable of a controlled subject in response to an axial position of a control shaft member.

BACKGROUND

A previous known drive apparatus converts rotational motion of a drive source into linear reciprocating motion of a control shaft member through a drive cam and adjusts a controlled variable of a controlled subject in response to an axial position of the control shaft member. In this drive apparatus, when a drive force of the drive source is stopped, it is required to cut a reverse input from the controlled subject to the control shaft member and to hold a given position of the drive cam and a given position of the control shaft member.

For example, in an actuator, which is recited in JP4025155B2, when a nut of a linear motion converting mechanism is rotated through rotation of an electric motor, a shaft portion, to which the nut is threadably engaged, is linearly moved. In a case where a lead angle of engaged threads of the nut and the shaft portion is reduced, a rotational angle of the nut relative to the amount of linear displacement of the shaft portion is increased. In such a case, the linear drive force of the shaft portion becomes insufficient relative to the frictional resistance at the engaged threads of the nut and the shaft portion, so that self-locking occurs to limit the linear movement of the shaft portion. Thus, when the supply of the electric power to the electric motor is stopped, the reverse input from the controlled subject, which drives the shaft portion, is cut, and thereby a given position of the shaft portion can be maintained.

In order to effectively use the self-locking function in the actuator of JP4025155B2, an output transmission efficiency from the electric motor to the shaft portion needs to be reduced. Therefore, it is required to excessively largely set the motor output relative to the output of the shaft portion. Thus, a size of the actuator is disadvantageously increased.

SUMMARY

The present disclosure addresses the above disadvantage. According to the present disclosure, there is provided a drive apparatus that adjusts a controlled variable of a controlled subject in response to an axial position of a control shaft member. The drive apparatus includes a drive source, a drive cam, a transmission device, the control shaft member and a reverse input cutoff clutch. The drive source generates a drive torque. The drive cam is rotated about a camshaft member upon application the drive torque of the drive source to the drive cam. A profile radius of the drive cam, which is a radial distance from a rotational center of the drive cam to an outer peripheral surface of the drive cam, is not uniform in a circumferential direction of the drive cam. The transmission device converts rotational motion of the drive cam into linear reciprocating motion upon rotation of the drive cam and transmits the converted linear reciprocating motion to the control shaft member. The control shaft member is connected to the controlled subject and is linearly reciprocated together with the transmission device in an axial direction upon the rotation of the drive cam. The reverse input cutoff clutch transmits the drive torque, which is received from the drive source, to the drive cam. The reverse input cutoff clutch non-rotatably locks an output shaft of the drive source in response to a reverser input torque transmitted from the controlled subject through the drive cam.

BRIEF DESCRIPTION OF THE DRAWINGS

The drawings described herein are for illustration purposes only and are not intended to limit the scope of the present disclosure in any way.

FIG. 6A is an axial cross-sectional view of a reverse input cutoff clutch of the drive apparatus;

FIG. 6B is a front view of an input shaft indicated by VIB in FIG. 6A;

FIG. 6C is a view taken in a direction of an arrow VIC in FIG. 6B;

DETAILED DESCRIPTION

Various embodiments of the present disclosure will be described with reference to the accompanying drawings.

First Embodiment

A drive apparatus according to a first embodiment of the present disclosure will be described with reference to FIGS. 1 to 7.

Figure 3:
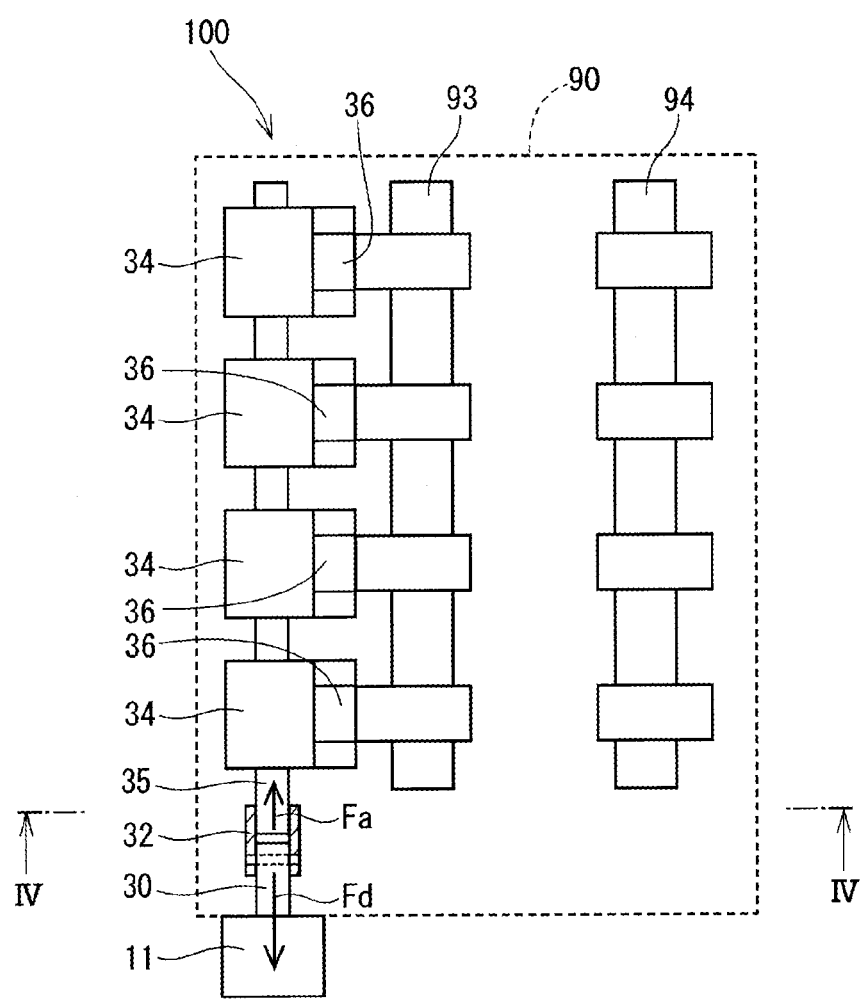
FIG. 3 is a schematic diagram showing a valve lift control system, which has the drive apparatus of the first embodiment.
Figure 4:
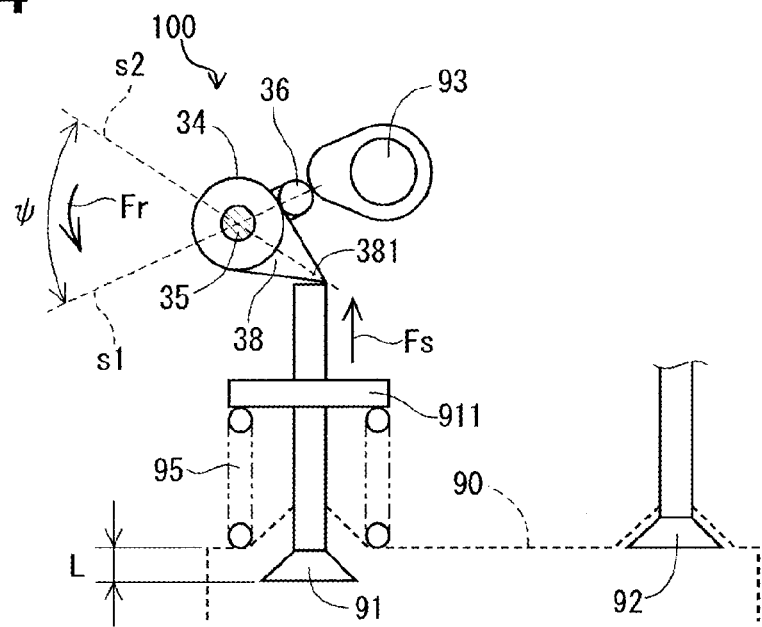
FIG. 4 is a cross-sectional view taken along line IV-IV in FIG. 3.

As shown in FIGS. 3 and 4, the drive apparatus of the present disclosure is used as a drive apparatus 11 of a valve lift control system 100, which adjusts the lift amount (controlled variable) L of respective intake valves 91 of, for example, a four cylinder internal combustion engine 90 in response to an axial position of a control shaft member 30.

The valve lift control system 100 includes the drive apparatus 11, an extension shaft 35, a plurality of helical splines 34, a plurality of rollers 36 and a plurality of rocker cams 38. The drive apparatus 11 includes the control shaft member 30, which is configured to linearly reciprocate. The extension shaft 35 is connected to the control shaft member 30. The number of the helical splines 34, the number of the rollers 36 and the number of the rocker cams 38 correspond to the number of cylinders of the engine 90.

For example, an inner wall of the helical spline 34 is meshed with an outer wall of the extension shaft 35 through helical gear teeth. The helical spline 34 is rotated in response to the linear reciprocating motion of the control shaft member 30 and the extension shaft 35. In this way, an opening angle $\psi$ between an imaginary line s1, which connects between a center of the extension shaft 35 and the roller 36, and an imaginary line s2, which connects between the center of the extension shaft 35 and a nose 381 of the rocker cam 38, is changed.

The roller 36 contacts a cam portion of an intake valve camshaft 93. When the position of the roller 36 is changed in response to the rotation of the intake valve camshaft 93, the rocker cam 38 is swung. The nose 381 of the rocker cam 38 contacts a base end of the intake valve 91. The intake valve 91 is lifted in response to the swing motion of the rocker cam 38. Therefore, the lift amount L of the intake valve 91 can be adjusted by changing the opening angle $\psi$ through the adjustment of the axial position of the control shaft member 30 and the extension shaft 35.

The valve lift control system 100 of the present embodiment does not adjust the lift amount of respective exhaust valves 92, which are lifted through rotation of an exhaust valve camshaft 94.

Here, each intake valve 91 is urged in a valve-opening direction thereof, which is an upward direction in FIG. 4, by an urging force Fs of a valve spring 95 that contacts a flange 911. The urging force Fs upwardly pushes the nose 381 of the rocker cam 38 and generates a rotational force Fr to the helical spline 34 in a counterclockwise direction in FIG. 4. In the present embodiment, the rotational force Fr of the helical spline 34 is converted into a load Fa, which is exerted in a direction (an upward direction in FIG. 3) of pulling the extension shaft 35 and the control shaft member 30.

At the time of operating the drive apparatus 11, a drive force Fd, which urges the control shaft member 30 in an opposite direction (a downward direction in FIG. 3) that is opposite from the direction of the load Fa, is larger than the load Fa. However, when the operation of the drive apparatus 11 is stopped, the load Fa is exerted as a reverse input to the drive apparatus 11 from the helical spline 34 side, which is a controlled subject.

Figure 1:
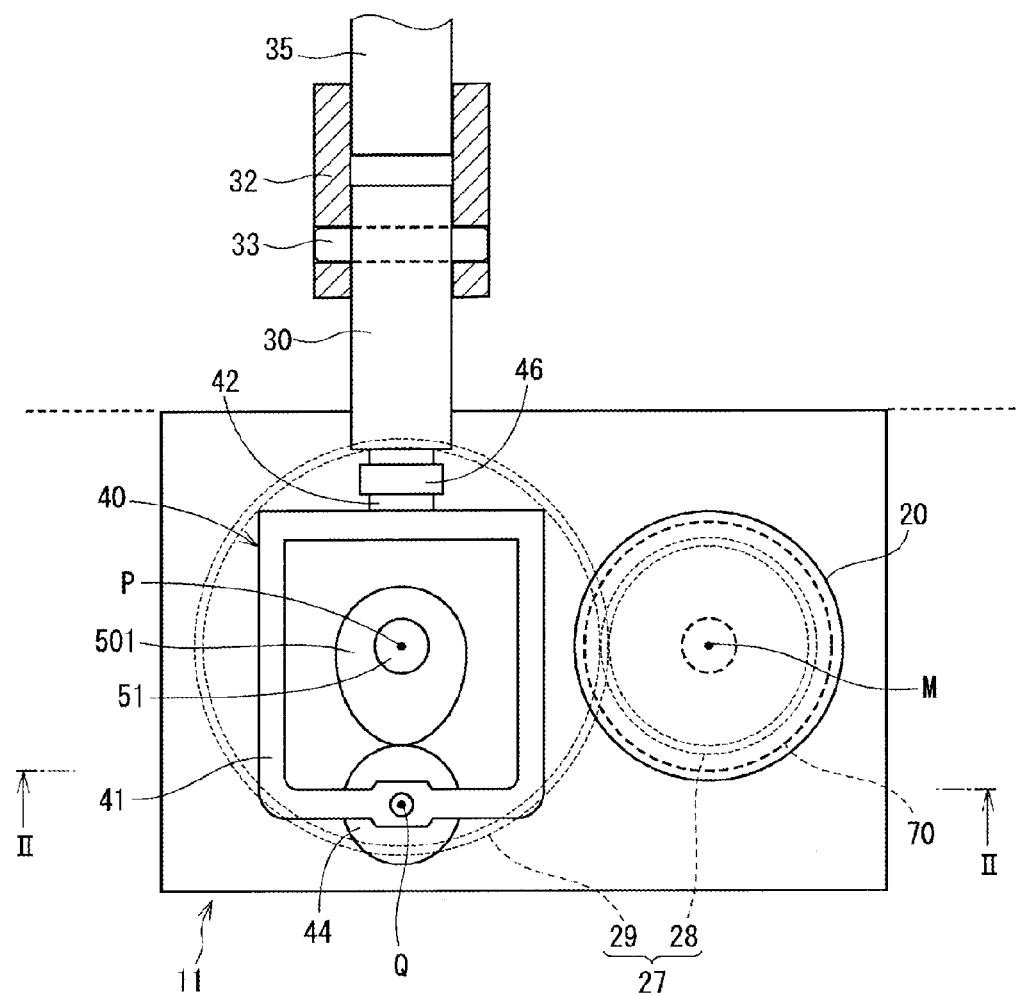
FIG. 1 is a schematic diagram showing a drive apparatus according to a first embodiment of the present disclosure.
Figure 2:
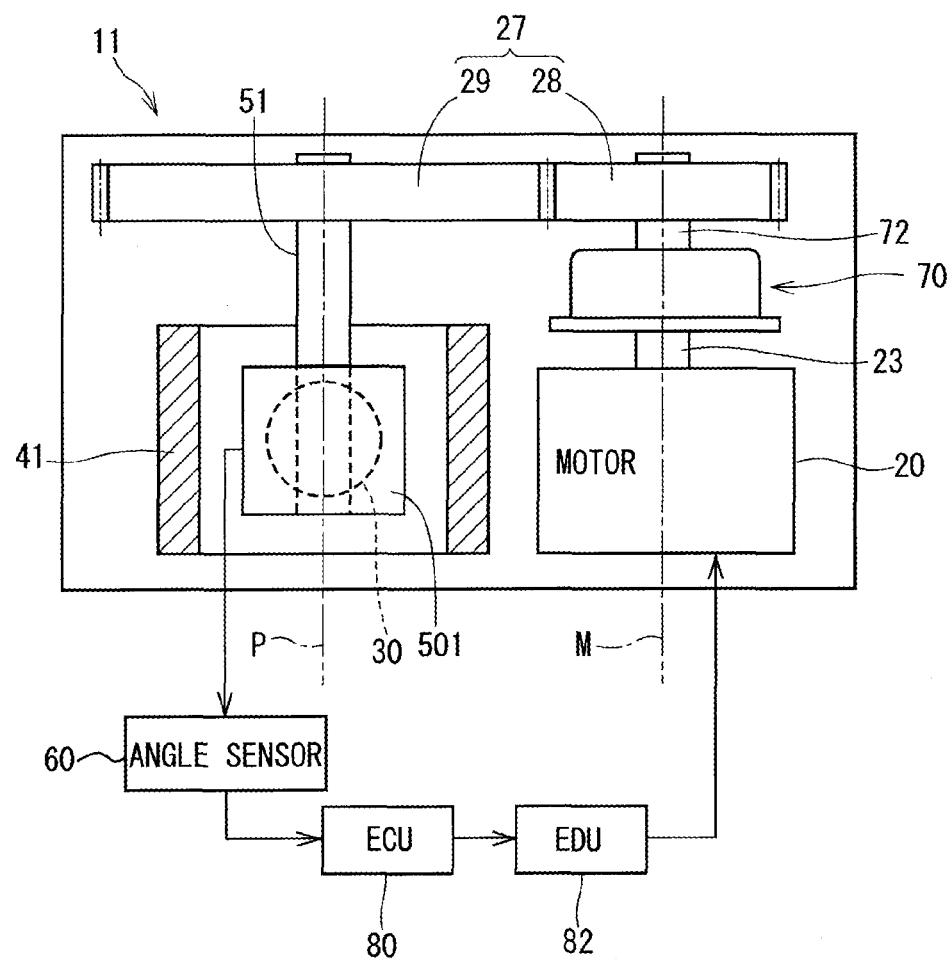
FIG. 2 is a cross sectional view taken along line II-II in FIG. 1.

Next, the structure of the drive apparatus 11 will be described with reference to FIGS. 1, 2 and 5.

The drive apparatus 11 includes an electric motor (serving as a drive source) 20, a reverse input cutoff clutch 70, a speed reducing mechanism (also referred to as a speed reducing means) 27, a drive cam 501, transmission device 40, the control shaft member 30 and an angle sensor 60. In the drive apparatus 11, the motor 20 generates the drive torque according to a command received from an electronic control unit (ECU) 80 and an electronic drive unit (EDU) 82.

The motor 20 is, for example, a direct current (DC) motor having a rotor and permanent magnets. The motor 20, more specifically, the rotor of the motor 20 is rotated about a rotational axis M. The motor 20 generates a drive torque at a motor shaft 23, which is an output shaft. The motor shaft 23 serves as an output shaft of the drive source.

The reverse input cutoff clutch 70 is joined to the motor shaft 23. Particularly, in the present embodiment, the reverse input cutoff clutch 70, which is configured generally into a cylindrical tubular form, has an outer diameter, which is generally the same as an outer diameter of the motor 20, which is also configured into a cylindrical tubular form. Furthermore, the reverse input cutoff clutch 70 is coaxial with the motor shaft 23.

The reverse input cutoff clutch 70 transmits the drive torque of the motor 20 to the drive cam 501 side. Furthermore, as discussed above, the reverse input cutoff clutch 70 locks the motor shaft 23 to disable rotation of the motor shaft 23 when the reverse input is transmitted from the helical spline 34 of the valve lift control system 100 through the drive cam 501. Details of the structure and the operation of the reverse input cutoff clutch 70 will be described later.

A camshaft member 51 is placed generally parallel to the rotational axis M of the motor 20 and the axis of the reverse input cutoff clutch 70.

The speed reducing mechanism 27 includes a gear 28 and a gear 29. The gear 28 is installed to an output-side member 72 of the reverse input cutoff clutch 70. The gear 29 is installed to the camshaft member 51. In the present embodiment, the gear 28 is a spur gear, and the gear 29 is also a spur gear. The gear 28 and the gear 29 are meshed with each other. A diameter of a pitch circle of the gear 29 is larger than a diameter of a pitch circle of the gear 28. The number of the gear teeth of the gear 29 is larger than the number of the gear teeth of the gear 28. The gear 28 and the gear 29 cooperate with each other to reduce the rotational speed of the rotation outputted from the output-side member 72 of the reverse input cutoff clutch 70 and transmit the rotation of the reduced rotational speed to the camshaft member 51. This speed reducing ratio is denoted as Z (>1).

Figure 5:
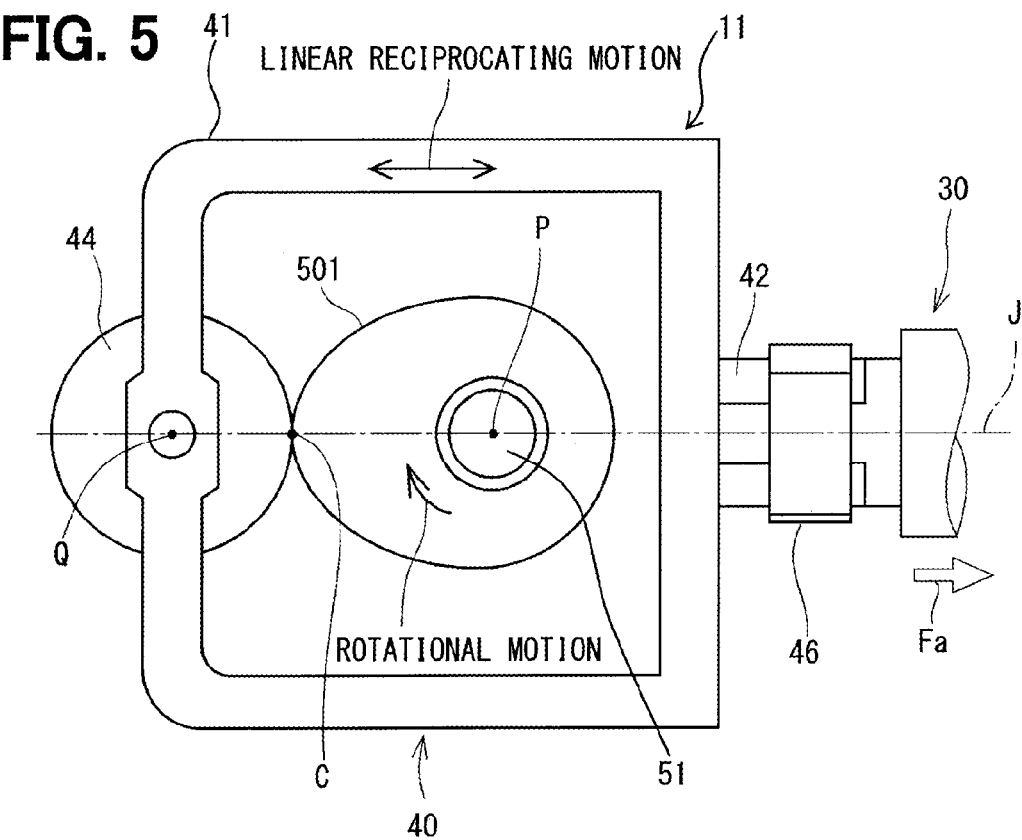
FIG. 5 is an enlarged view showing a transmission device of the drive apparatus shown in FIG. 1.

As shown in FIG. 5, the drive cam 501 has a profile radius (also referred to as a cam radius) R, which is a radial distance from a rotational center P to a profile of the drive cam 501 (i.e., an outer peripheral surface of the drive cam 501). The profile radius R of the drive cam 501 is not uniform in a circumferential direction of the drive cam 501. The drive cam 501 is placed in an inside of a support frame (serving as a support member) 41 in such a manner that the drive cam 501 is rotatable together with the camshaft member 51 about the rotational center P. In the present embodiment, a roller (serving as a contact member) 44, which is supported by the support frame 41, is urged by the load Fa discussed above such that the roller 44 contacts the profile, i.e., the outer peripheral surface of the drive cam 501 through a contact point C.

The contact point C between the roller 44 and the drive cam 501 is a line that extends in a direction of a depth of the plane of FIG. 5 in a three-dimensional view, so that the contact point C is a contact line in reality. However, in this discussion, for the sake of two-dimensional interpretation of the structure shown in, for example, FIG. 5, this contact line is referred to as the contact point C.

When the drive cam 501 is rotated, the profile radius R at the contact point C changes. Thereby, the roller 44, the support frame 41 and the control shaft member 30 are linearly reciprocated in the left-to-right direction in FIG. 5 in response to the rotation of the drive cam 501.

The transmission device 40 includes the support frame 41 and the roller 44. The transmission device 40 converts the rotational motion of the drive cam 501 into the linear reciprocating motion and transmits the converted linear reciprocating motion to the control shaft member 30. The support frame 41, which is configured into a quadrangular form, rotatably supports the roller 44, which is configured into a cylindrical tubular form, such that the roller 44 is rotatable about an axis Q on an opposite side of the drive cam 501, which is opposite from the control shaft member 30 in the radial direction of the drive cam 501. The rotational center P of the drive cam 501, the axis Q of the roller 44 and the contact point C are placed along an axis J of the control shaft member 30.

The control shaft member 30 extends in a direction that is generally perpendicular to the axis of the camshaft member 51. One end portion of the control shaft member 30 is joined to a connecting portion 42 of the support frame 41 through a clip 46.

Referring back to FIGS. 1 and 2, the other end portion of the control shaft member 30, which is opposite from the one end portion of the control shaft member 30, is joined to the extension shaft 35 of the valve lift control system 100 through a coupling 32 and a pin 33. In the present embodiment, the motor 20, the reverse input cutoff clutch 70 and the transmission device 40 are placed on the same side (common side) of the speed reducing mechanism 27.

The angle sensor 60 has a magnetic sensing device, which senses a rotational angle of the camshaft member 51.

The ECU 80 receives a measurement signal of the angle sensor 60 and other measurement signals (e.g., a measurement signal from an accelerator opening degree sensor). The ECU 80 outputs a control signal to the EDU 82 based on the inputted sensor measurement signals.

The EDU 82 drives the motor 20 based on the control signal received from the ECU 80.

Figure 7:
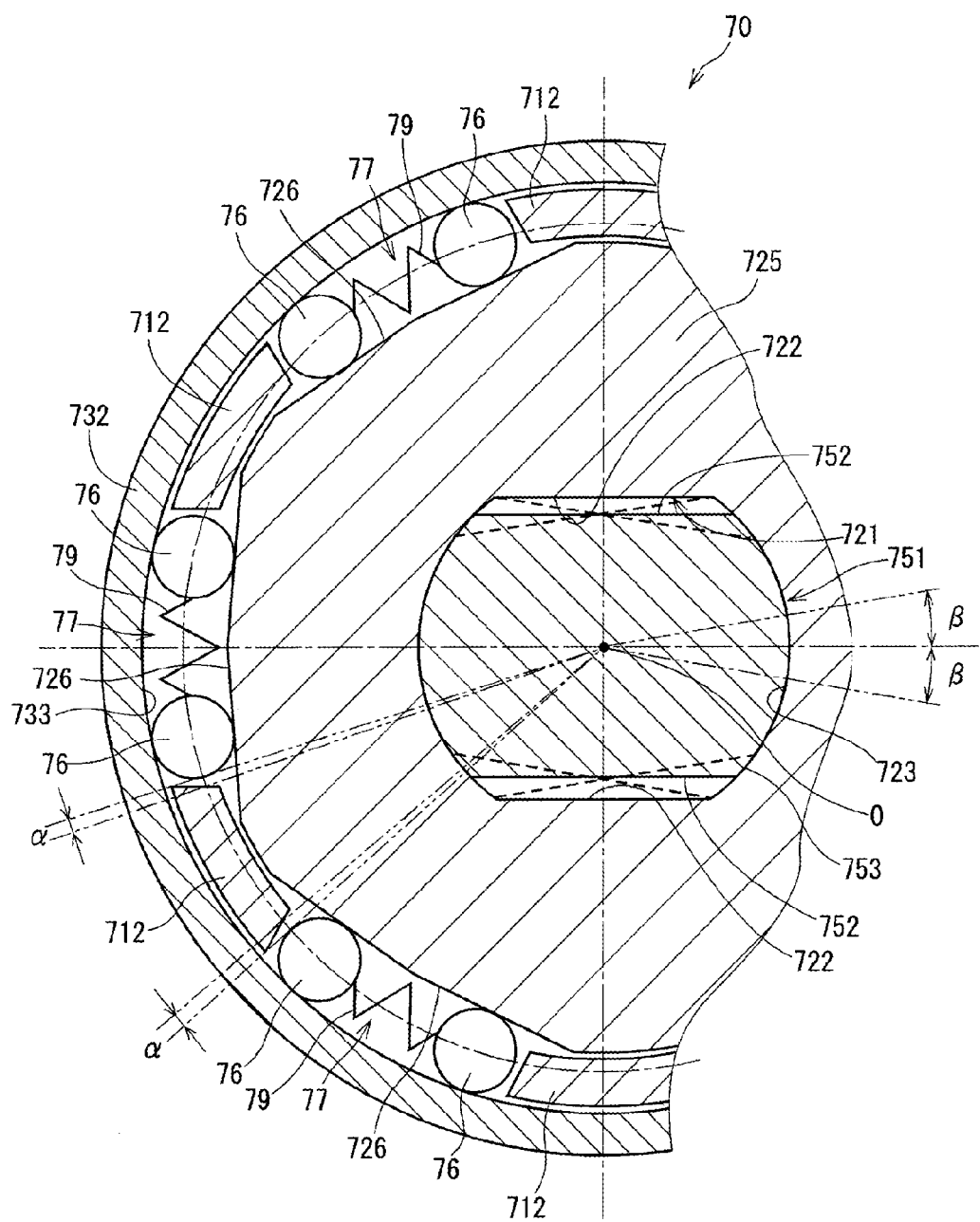
FIG. 7 is a cross sectional view taken along line VII-VII in FIG. 6A.

Next, the specific structure of the reverse input cutoff clutch 70 will be described with reference to FIGS. 6 and 7. This structure is recited in JP4141812B2. FIG. 7 shows a neutral position of the reverse input cutoff clutch 70, in which the torque is not applied from the input-side and the output-side.

As shown in FIGS. 6 and 7, the reverse input cutoff clutch 70 includes an input-side member 71, the output-side member 72, a stationary-side member 73, a plurality of rollers 76 and a plurality of lock springs 79.

The input-side member 71 includes a base plate portion 711, a plurality of pillars 712 and a tubular portion 713. The pillars 712 are arranged one after another along the base plate portion 711 in the circumferential direction of the base plate portion 711 and axially project from the base plate portion 711 toward the output side member 72. A receiving space 77 is formed between each circumferentially adjacent two of the pillars 712. Corresponding two of the rollers 76 are received in each receiving space 77.

An input shaft 75 is inserted into an inside of the tubular portion 713 of the input-side member 71. In the present embodiment, the motor shaft 23 corresponds to the input shaft 75 and a distal end portion of the motor shaft 23 is configured into a form discussed below. Here, the motor shaft 23 will be described as the input shaft 75 in general.

The input shaft 75, which is inserted into the inside of the tubular portion 713, has two planar outer surfaces 752, which are generally parallel to each other diametrically opposed to each other) and are spaced from each other. The planar outer surfaces 752 of the input shaft 75 are engaged with a planar portion formed in the inside of the tubular portion 713, so that the input-side member 71 and the input shaft 75 are integrally rotatably connected with each other.

The output-side member 72 includes an output shaft portion 727 and a flange portion 725.

The flange portion 725 of the output-side member 72 is configured into a polygonal form (a regular hexagon form in the exemplary case of FIG. 7). An outer wall of each of sides of the flange portion 725 forms a cam surface 726. The cam surfaces 726 are arranged at equal intervals in the circumferential direction. Furthermore, the output-side member 72 has a hole portion 721. The hole portion 721 is defined by two planar inner surfaces 722, which are opposed to each other and are generally parallel to each other, and two arcuate inner surfaces 723, which connect between the planar inner surfaces 722 and are opposed to each other.

A shaft portion 751 of the input shaft 75 is fitted into the hole portion 721. Besides the two planar outer surfaces 752, the shaft portion 751 of the input shaft 75 also has two arcuate outer surfaces 753, which are opposed to each other and connect between the planar outer surfaces 752. The planar outer surfaces 752 and the arcuate outer surfaces 753 correspond to the planar inner surfaces 722 and the arcuate inner surfaces 723, respectively, of the hole portion 721 of the output-side member 72. A gap is formed between each of the planar outer surfaces 752 of the shaft portion 751 and the corresponding one of the planar inner surfaces 722 of the hole portion 721 to enable relative rotation between the planar outer surface 752 and the planar inner surface 722 by an angle $\beta$ from the neutral position shown in FIG. 7 in each of a normal direction and a reverse direction. Furthermore, each of the arcuate outer surfaces 753 of the shaft portion 751 is slidably fitted to the corresponding one of the arcuate inner surfaces 723 of the hole portion 721.

Furthermore, a distal cylindrical shaft portion 754, which is formed in a distal end portion of the input shaft 75 is fitted into a cylindrical hole (an arcuate hole) 724 of the output-side member 72.

The stationary-side member 73 includes a cylindrical tubular portion 731 and a large diameter covering portion 732. A radial bearing member 78 is placed between the cylindrical tubular portion 731 and an outer peripheral surface of the output shaft portion 727 of the output-side member 72.

A cylindrical surface (a circular surface) 733, which is an inner peripheral surface of the large diameter covering portion 732 of the stationary-side member 73, is radially opposed to the cam surfaces 726 such that a wedge-shaped space is defined between the cylindrical surface 733 and each cam surface 726.

The stationary-side member 73 is fixed to a housing (not shown) along with a fixation-side plate 74.

Each corresponding two of the rollers 76 are received in the corresponding one of the spaces 77, each of which is circumferentially defined between the corresponding circumferentially adjacent two of the pillars 712 at a radial location between the corresponding cam surface 726 of the output-side member 72 and the cylindrical surface 733 of the stationary-side member 73. Each one of the lock springs 79 is interposed between the corresponding two of the rollers 76 to urge the rollers 76 away from each other in the circumferential direction.

In the neutral position shown in FIG. 7, a circumferential gap, which has an angular extent $\alpha$ that is smaller than the angle $\beta$, is present between the pillar 712 of the input-side member 71 and the adjacent one of the rollers 76. When the input-side member 71 is rotated relative to the output-side member 72 by the angle $\alpha$ in the normal direction or the reverse direction from the neutral position, the roller 76 contacts the pillar 712.

In the neutral position shown in FIG. 7, each lock spring 79 circumferentially urges the corresponding two rollers 76 away from each other, so that each roller 76 is urged between the corresponding cam surface 726 and the stationary-side member 73. In this state, when the reverse input torque is inputted to the output-side member 72 in the normal direction or the reverse direction, the roller 76 is urged into the wedge shaped space. Thereby, the rotation of the output-side member 72 is locked. Therefore, the reverse input torque is cut and is thereby not transmitted from the output-side member 72 to the input-side member 71.

In contrast, when the input-side member 71 is rotated by the angle α in the normal direction or the reverse direction from the neutral position, the pillar 712 of the input-side member 71 pushes the roller 76 out of the wedge shaped space. Thereby, the lock state is released, and the rotation of the output-side member 72 is enabled. Hereinafter, this angle α will be referred to as a release angle α.

Furthermore, when the input-side member 71 is rotated by the angle β from the neutral position, an end portion of each planar outer surface 752 of the shaft portion 751 contacts a corresponding end portion of a corresponding one of the planar inner surfaces 722 to limit the relative rotation of the input-side member 71 relative to the output-side member 72. Thereby, the input torque from the input-side member 71 is transmitted to the output-side member 72 through the shaft portion 751 and the hole portion 721, so that the output-side member 72 is rotated together with the input-side member 71. Hereinafter, this angle β will be referred to as a transmission angle β.

When the input torque from the input-side member 71 is lost, each of the rollers 76 is urged by the resilient restoration force of the corresponding lock spring 79 and is thereby returned to the neutral position shown in FIG. 7, so that the reverse input cutoff clutch 70 is placed in the lock state once again.

As described above, when the operational state of the reverse input cutoff clutch 70 is changed from the lock state at the neutral position to the transmission state, it is required to release the lock state by rotating the input-side member 71 by the release angle α and then further rotating the input-side member 71 by the transmission angle β.

Furthermore, when the reverse input torque, which is exerted in the direction opposite to the direction of the input torque, is inputted to the output-side member 72, the pillar 712 is moved away from the roller 76 through rotation of the input-side member 71 from the transmission state in the direction of the reverse input torque by a lock angle γ, which corresponds to a difference between the transmission angle β and the release angle α (i.e., γ=β−α). Thereby, the operational state is shifted to the lock state.

Next, the operation of the drive apparatus 11 will be described.

When the motor 20 is driven by the EDU 82, the drive torque of the motor 20 is transmitted to the camshaft member 51 and the drive cam 501 through the reverse input cutoff clutch 70 and the speed reducing mechanism 27. When the drive cam 501 is rotated, the support frame 41, which supports the roller 44 that is in contact with the drive cam 501, is reciprocated in the direction perpendicular to the axial direction of the camshaft member 51 in response to a change in the profile radius R at the contact point C. Thereby, the control shaft member 30, which is joined to the support frame 41, is linearly reciprocated, so that the extension shaft 35 of the valve lift control system 100 is linearly reciprocated.

In response to the axial position of the control shaft member 30 and the extension shaft 35, each helical spline 34 of the valve lift control system 100 is rotated to change the opening angle ψ (see FIG. 4), which is defined according to the position of the roller 36 and the position of the rocker cam 38. Thus, the lift amount L of the intake valve 91 is changed.

When the engine 90 is stopped, the EDU 82 stops the supply of the electric power to the motor 20. When the drive force Fd of eh drive apparatus 11 becomes lower than a reverse input load Fa from the helical spline 34 side upon the stopping of the motor 20, the reverse input torque is applied to the output-side member 72 of the reverse input cutoff clutch 70 through the drive cam 501 and the speed reducing mechanism 27 according to the load Fa.

However, the motor shaft 23, which is the input shaft 75 of the reverse input cutoff clutch 70, is non-rotatably locked by the reverse input cutoff clutch 70, so that the given rotational position of the drive cam 501 and the given axial position of the control shaft member 30 are maintained.

At this time, to be exact, the drive cam 501 is placed in the lock sate at the rotational position that is reached by rotating the drive cam 501 by a small return angle in the direction of the reverse input torque from the corresponding position, at which the drive force Fd becomes lower than the reverse input load Fa. This return angle is derived from the lock angle γ implemented by the structure of the reverse input cutoff clutch 70.

In a comparative case where the drive cam 501 is directly connected to the output-side member 72 of the reverse input cutoff clutch 70, the lock angle γ of the reverse input cutoff clutch 70 directly becomes the return angle of the drive cam 501. In contrast, according to the present embodiment, the speed reducing mechanism 27, which has the speed reducing ratio Z, is placed between the reverse input cutoff clutch 70 and the drive cam 501. Therefore, in comparison to the comparative case where the drive cam 501 is directly connected to the output-side member 72 of the reverse input cutoff clutch 70, the return angle of the drive cam 501 is reduced by 1/Z in the present embodiment.

Next, the advantages of the drive apparatus 11 of the present embodiment will be described.

(1) In the actuator of JP4025155B2, the output of the electric motor needs to be excessively largely set in order to cut the reverse input from the driven subject through use of the self-locking function at the threadably engaged portion between the nut and the shaft portion. Therefore, the size of the device needs to be increased.

Furthermore, in JP2005-146865A (corresponding to US2005/0120987A1), a coaxial circular section, which has a constant profile radius along the entire circumferential extent thereof, is formed in the drive cam. The given axial position of the control shaft member is maintained when the drive force of the drive source is stopped at a location where the coaxial circular section contacts the roller. However, in other section of the drive cam, which is other than the coaxial circular section, this holding effect for holding the given position of the control shaft member cannot be achieved.

In contrast, in the drive apparatus 11 of the present embodiment, the reverse input cutoff clutch 70 is placed between the motor 20 and the drive cam 501. With this simple structure, the reverse input from the controlled subject is cut, and thereby the given rotational position of the drive cam 501 and the given axial position of the control shaft member 30 are advantageously maintained. In this case, it is not required to excessively increase the output of the motor 20 unlike the actuator of JP4025155B2. Thus, the small motor can be used, and thereby the size of the drive apparatus 11 can be made relatively small. Furthermore, at the time of stopping the drive force of the drive source, the rotational position of the drive cam 501 can be at any location. That is, it is not required to place the drive cam 501 in any specific location.

Thereby, in the valve lift control system 100, which has the drive apparatus 11, the predetermined lift amount of each intake valve 91 can be maintained during the operation of the engine 90. Thus, the required startability of the engine is achieved, and the fuel consumption of the engine can be improved at the time of driving the vehicle.

(2) In the present embodiment, the speed reducing mechanism, which has the speed reducing ratio Z (>1), is placed between the reverse input cutoff clutch 70 and the drive cam 501. Thereby, the return angle of the drive cam relative to the lock angle γ of the reverse input cutoff clutch 70 can be reduced to the angle of 1/Z. Thus, the response of the reverse input cutoff at the time of stopping the supply of the electric current to the motor 20 is improved, and the accurate positioning at the holding position is made possible.

(3) In the present embodiment, the reverse input cutoff clutch 70 is placed coaxial to the motor shaft 23. The motor 20 and the reverse input cutoff clutch 70 are configured into the generally cylindrical tubular form. Therefore, the diameter of the motor 20 and the diameter of the reverse input cutoff clutch 70 can be made generally equal to each other to coaxially place the motor 20 and the reverse input cutoff clutch 70. In this way, the available installation space can be effectively used. Thus, the size of the drive apparatus 11 can be made relatively small.

(4) In the present embodiment, the motor 20, the reverse input cutoff clutch 70 and the transmission device 40 are placed on the same side (common side) of the speed reducing mechanism 27. Therefore, the available installation space can be effectively used, and thereby the size of the drive apparatus 11 can be further reduced.

Second Embodiment

Next, a second embodiment of the present disclosure and a modification thereof will be described with reference to FIGS. 8 to 10. The second embodiment is characterized by the profile of the drive cam and the control operation of the stop cam angle of the drive cam executed by the ECU 80, which serves as a controller (a control means).

Figure 8:
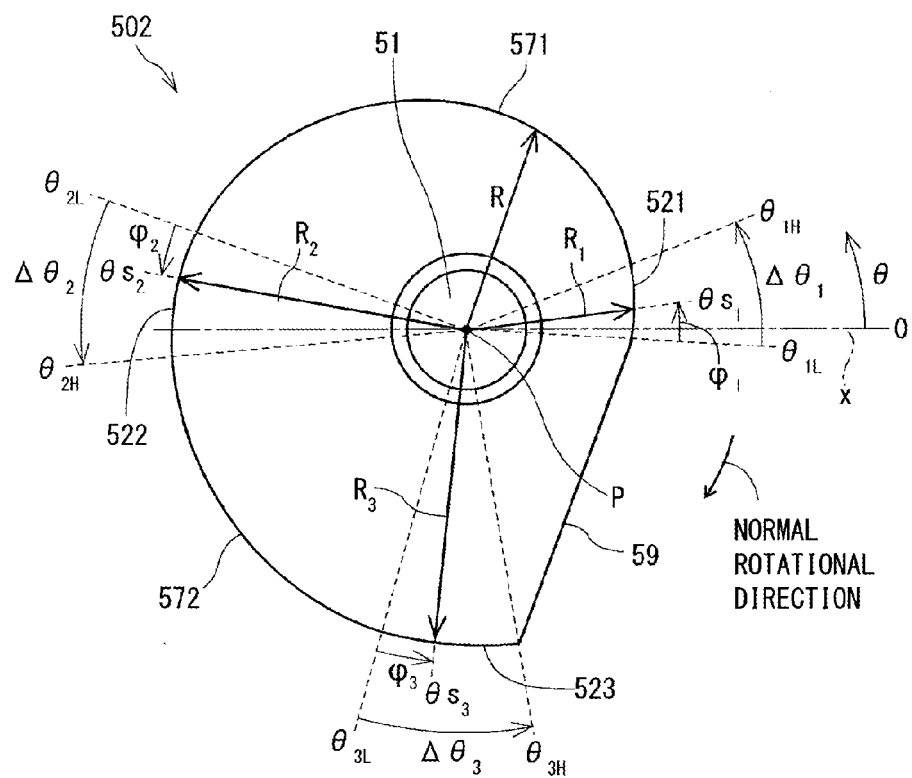
FIG. 8 is a schematic diagram showing a drive cam of a drive apparatus according to a second embodiment of the present disclosure.

As shown in FIG. 8, the drive cam 502 of the second embodiment is configured such that the profile radius R of the drive cam 502 continuously changes in response to the rotational angle of the drive cam 502. In FIG. 8, a reference axis x of the cam angle θ extends in a right direction from a rotational center P of the drive cam 502, and the cam angle θ is positive in a counterclockwise direction from the reference axis x) (θ=0°). The drive cam 502 is rotated in a clockwise direction of FIG. 8, which is the normal rotational direction.

A curved area of the profile of the drive cam 502, which is other than a linear connecting portion 59 that linearly extends, is divided into a plurality of holding sections and a plurality of non-holding sections. The non-holding sections are sections of the curved area of the profile of the drive cam 502, which are other than the holding sections. The holding sections can contact the roller 44 when the drive force of the motor 20 is stopped. In the present embodiment, the holding sections include three holding sections 521, 522, 523. The first holding section 521, the second holding section 522 and the third holding section 523 correspond to a most retarded position, a middle position, and a most advanced position, respectively, of the control shaft portion 30 in the axial direction of the control shaft portion 30. The first holding section 521, the second holding section 522 and the third holding section 523 also correspond to a low mode, a middle mode and a high mode of the lift amount L of the intake valve 91 of the valve lift control system 100.

The non-holding section 571 is circumferentially placed between the first holding section 521 and the second holding section 522. The non-holding section 572 is circumferentially placed between the second holding section 522 and the third holding section 523.

An angular range $\Delta\theta_1$ from a minimum cam angle $\theta_{1L}$ to a maximum cam angle $\theta_{1H}$ in the first holding section 521, an angular range $\Delta\theta_2$ from a minimum cam angle $\theta_{2L}$ to a maximum cam angle $\theta_{2H}$ in the second holding section 522, and an angular range $\Delta\theta_3$ from a minimum cam angle $\theta_{3L}$ to a maximum cam angle $\theta_{3H}$ in the third holding section 523 are set to be equal to each other. Furthermore, the amount of change in the profile radius R relative to the amount of change in the cam angle θ is equally set in the angular range of each of the first to third holding sections 521, 522, 523. That is, a profile of a value of dR/dθ, which is obtained by differentiating the profile radius R with respect to the cam angle θ, is the same for the angular range of each of the first to third holding sections 521, 522, 523. In other words, the profile radius R is offset with respect to the cam angle θ among the first to third holding sections 521, 522, 523.

Here, the profile radius $R_1$ of the first holding section 521 at the stop cam angle $\theta S_1$, the profile radius $R_2$ of the second holding section 522 at the stop cam angle $\theta S_2$, and the profile radius $R_3$ of the third holding section 523 at the stop cam angle $\theta S_3$ have a relationship of $R_1 < R_2 < R_3$.

Figure 9:
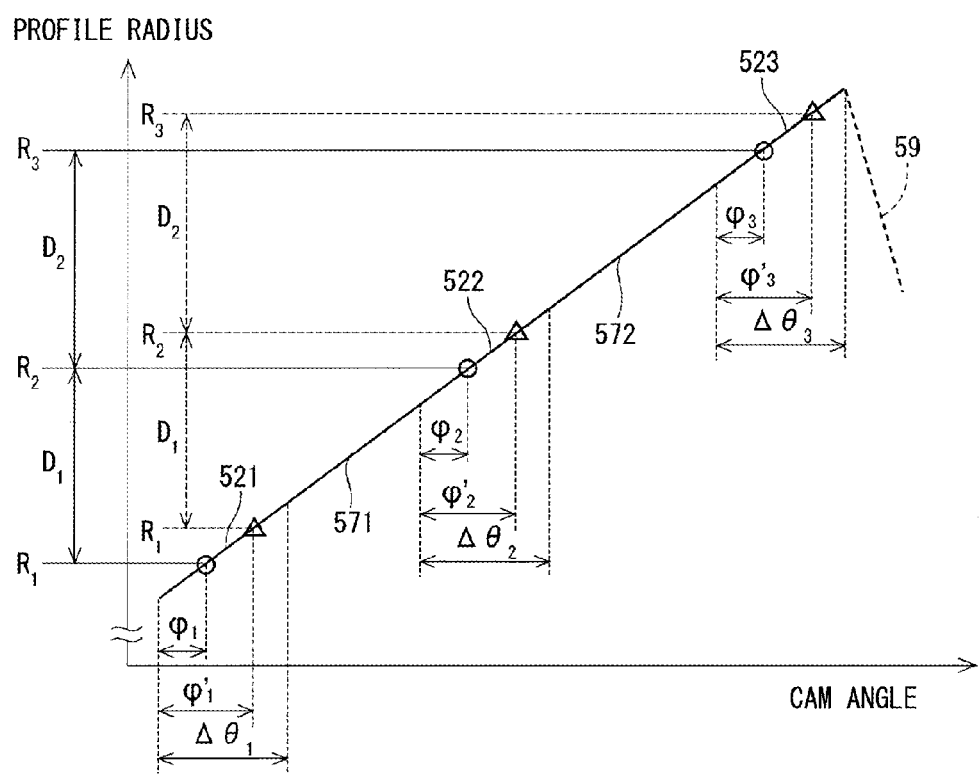
FIG. 9 is a diagram showing a relationship between a cam angle and a profile radius of the drive cam of the second embodiment.

Particularly, according to the present embodiment, as shown in FIG. 9, the amount of change in the profile radius R relative to the amount of change in the cam angle θ is constant in the angular range of each of the first to third holding sections 521, 522, 523, and the profile radius R linearly increases at a constant gradient (a constant slope). That is, the value of dR/dθ in each of the angular ranges of the first to third holding sections 521, 522, 523 is a positive constant.

Furthermore, the gradient of the profile radius R is constant even in the non-holding sections 571, 572.

The ECU 80 controls the stop cam angle in such a manner that the rotation of the drive cam 502 is stopped in the state where a selected one of the first to third holding sections 521, 522, 523 contacts the roller 44 at the time of stopping the drive force of the motor 20.

With respect to the control of the stop cam angle $\theta S_1$, $\theta S_2$, $\theta S_3$, the ECU 80 selects one of the first to third holding sections 521, 522, 523, which contacts the roller 44 at the time of stopping the drive cam 502. Furthermore, the ECU 80 sets a corresponding predetermined value as each angular difference $\phi_1$, $\phi_2$, $\phi_3$, which is from the minimum cam angle $\theta_{1L}$, $\theta_{2L}$, $\theta_{3L}$ to the stop cam angle $\theta S_1$, $\theta S_2$, $\theta S_3$, in each of the first to third holding sections 521, 522, 523, and this predetermined value is individually set for the manufactured drive apparatuses 11, which are manufactured in a factory. This setting of the predetermined value of the individual drive apparatus 11 will be performed in a procedure discussed later.

With reference to a θ-R correlation line shown in FIG. 9, for the descriptive purpose, it is now assumed that the following settings are made. Specifically, in one of the manufactured drive apparatuses 11, the stop cam angle (indicated by a circle along the θ-R correlation line), which is specified by the angular difference $\phi_1$, $\phi_2$, $\phi_3$ from the minimum cam angle $\theta_{1L}$, $\theta_{2L}$, $\theta_{3L}$, is set. In another one of the manufactured drive apparatuses 11, the stop cam angle (indicated by a triangle along the θ-R correlation line), which is specified by the angular difference $\phi'_1$, $\phi'_2$, $\phi'_3$, from the minimum cam angle $\theta_{1L}$, $\theta_{2L}$, $\theta_{3L}$, is set. The angular difference $\phi_1$, $\phi_2$, $\phi_3$ and the angular difference $\phi'_1$, $\phi'_2$, $\phi'_3$ have the following relationships.

$$\phi_1 = \phi_2 = \phi_3$$

$$\phi'_1 = \phi'_2 = \phi'_3$$

With the above settings, a difference $D_1$ between the profile radius $R_1$ and the profile radius $R_2$ and a difference $D_2$ between the profile radius $R_2$ and the profile radius $R_3$ are always constant regardless of the values of the angular differences in the manufactured drive apparatuses 11. Each of the differences $D_1$, $D_2$ is reflected into a relative stroke between corresponding two of the most retracted position, the middle position and the most forwarded position of the control shaft member 30. Therefore, in each manufactured drive apparatus 11 of the present embodiment, the relative stroke of the control shaft member 30 becomes constant regardless of the product-to-product variations among the manufactured drive apparatuses 11.

Next, the angular difference $\phi_1$, $\phi_2$, $\phi_3$, which is individually set for the manufactured drive apparatuses 11, will be described. The angular difference $\phi_1$, $\phi_2$, $\phi_3$ is set based on a relative position (an initial position) of the drive apparatus 11 relative to the valve lift control system 100 at the time of installing the drive apparatus 11 to the valve lift control system 100.

First of all, a disadvantage of a prior art technique in the process of installing the drive apparatus 11 to the valve lift control system 100 will be described with reference to FIGS. 11A and 11B.

Figure 11A:
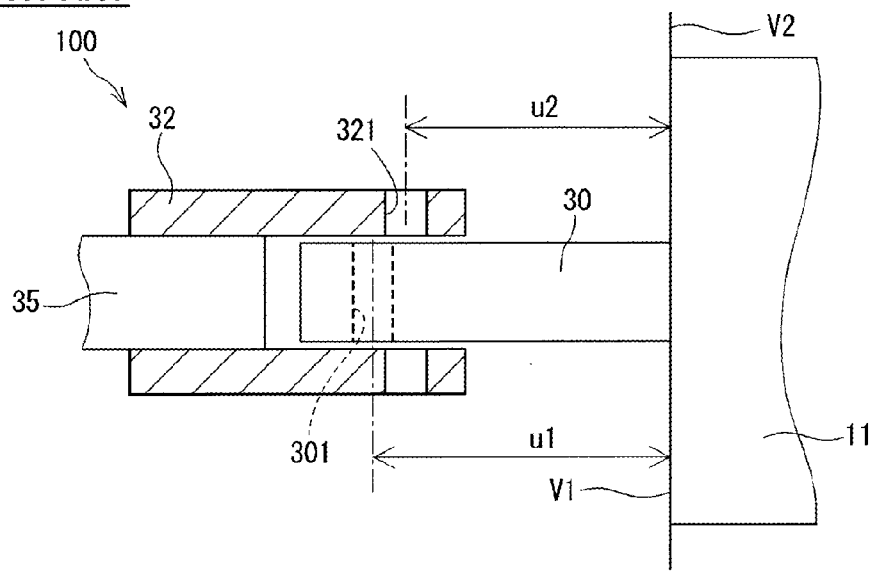
FIGS. 11A and 11B are schematic diagrams showing a shim adjustment process of a prior art technique.
Figure 11B:
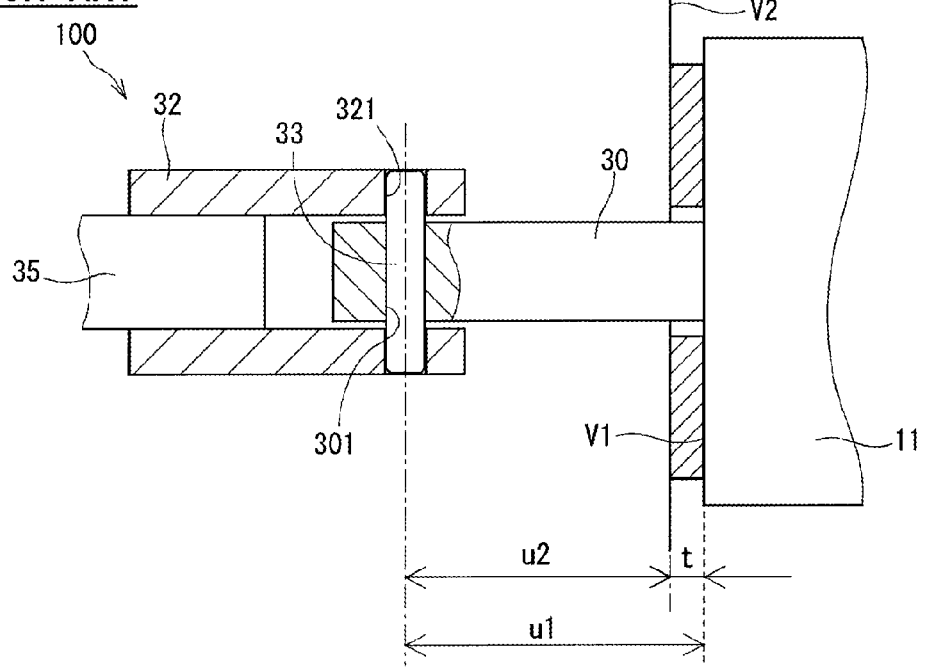

As shown in FIGS. 11A and 11B, in the drive apparatus 11, a first through-hole 301 extends through a distal end portion of the control shaft member 30 in a radial direction. In the valve lift control system 100, the coupling 32, which is configured into a pipe form, is fixed to a distal end portion of the extension shaft 35. A second through-hole 321 extends through the coupling 32 in the radial direction. An inner diameter of the first through-hole 301 is generally the same as an inner diameter of the second through-hole 321. When the distal end portion of the control shaft member 30 is inserted into the coupling 32 through a predetermined length, the first through-hole 301 and the second through-hole 321 are coaxially placed. At this position, when the pin 33 is inserted from one end of the second through-hole 321 to the other end of the second through-hole 321 through the first through-hole 301, the control shaft member 30 and the coupling 32 are connected with each other.

Here, a distance from an installation side end surface V1 of the drive apparatus 11 to a center (a center axis) of the first through-hole 301 is denoted as u1, and a distance from a reference surface V2 of the valve lift control system 100 to a center (a central axis) of the second through-hole 321 is denoted as a u2. For instance, in a case where the relationship of u1=u2 is satisfied, when the installation side end surface V1 of the drive apparatus 11 directly contacts the reference surface V2 of the valve lift control system 100, the position of the first through-hole 301 coincides with the position of the second through-hole 321.

However, in a real product, it is difficult to always satisfy the relationship of u1=u2 due to, for example, size variations of respective components. Therefore, in view of upper and lower size limits of the respective components, the relative sizes are set to make the relationship of u1≥u2, as shown in FIG. 11A. Then, according to the real size of the individual product, a shim 14, which has a thickness t that corresponds to (u1−u2), is interposed between the reference surface V2 and the installation side end surface V1 of the drive apparatus 11, as shown in FIG. 11B, so that the position of the first through-hole 301 coincides with the position of the second through-hole 321, and thereafter the pin 33 is inserted from the one end of the second through-hole 321 to the other end of the second through-hole 321 through the first through-hole 301. This process is referred to as an initial position adjusting process.

In this case, shim elements of a common type, each of which has a standard thickness, may be used, or various types of shim elements, which have different thicknesses, respectively, may be provided, and an appropriate combination of the shim elements may be selected and combined to form the shim 14 having the thickness t. This shim adjustment process requires an extra process time, so that the productivity is deteriorated.

Next, the initial position adjusting process in the installation operation for installing the drive apparatus 11 of the present embodiment to the valve lift control system 100 and the operation of the drive apparatus 11 after the installation operation will be described.

First of all, a process of determining the minimum cam angle $\theta_{1L}$ and the maximum cam angle $\theta_{1H}$ of the first holding section 521 will be described. In FIG. 11A, component tolerances and assembling tolerances are determined such that a variation range of the distance u1 and a variation range of the distance u2 at the most retarded position of the control shaft member 30 satisfy the following equations.

$$u1_{MIN} \leq u2_{MIN}, u2_{MAX} \leq u1_{MAX}$$

Here, $u1_{MIN}$ is a minimum value (more specifically, a possible minimum value) of the distance u1, and $U1_{MAX}$ is a maximum value (more specifically, a possible maximum value) of the distance u1. Furthermore, $u2_{MIN}$ is a minimum value (more specifically, a possible minimum value) of the distance u2, and $u2_{MAX}$ is a maximum value (more specifically, a possible maximum value) of the distance u2. These minimum values and maximum values may be obtained from "avr±3σ" based on an average value avr and a standard deviation σ.

Furthermore, in the drive apparatus 11, the minimum cam angle $\theta_{1L}$ and the maximum cam angle $\theta_{1H}$ are determined such that the minimum cam angle $\theta_{1L}$ of the first holding section 521 corresponds to the minimum value $u1_{MIN}$, and the maximum cam angle $\theta_{1H}$ corresponds to the maximum value $u1_{MAX}$.

Then, in the state where the installation side end surface V1 contacts the reference surface V2 of the valve lift control system 100, the stop cam angle $\theta S_1$, which corresponds to the distance u1 that satisfies the relationship of u1=u2, is measured for the individual drive apparatus 11 and is converted into the angular difference $\phi_1$, which is a difference from the minimum cam angle $\theta_{1L}$ to the stop cam angle $\theta S_1$. This angular difference $\phi_1$ is stored in the ECU 80. The minimum cam angle $\theta_{1L}$ and the maximum cam angle $\theta_{1H}$ are determined in the above described manner, so that the inclusion of the stop cam angle $\theta S_1$ in the first holding section 521 is ensured.

The drive apparatus 11 is installed to the valve lift control system 100 in the state where the drive cam 502 is rotated to the cam angle, which satisfies the relationship of u1=u2.

In the operation of the drive apparatus 11 after the installation of the drive apparatus 11 to the valve lift control system 100, at the time of stopping the engine 90, the ECU 80 selects a corresponding one of the first to third holding sections 521, 522, 523 of the drive cam 502, which corresponds to the axial position of the control shaft member 30 at the time of stopping the drive apparatus 11. Furthermore, the ECU 80 computes the stop cam angle based on the angular difference $\phi_1$ (=$\phi_2$=$\phi_3$), which is common to all of the holding sections 521, 522, 523, and the ECU 80 commands the computed stop cam angle to the EDU 82. The EDU 82 stops the supply of the electric power to the motor 20 such that the drive cam 502 is stopped in the commanded stop cam angle, which is commanded from the ECU 80.

Next, advantages of the drive apparatus 11 of the second embodiment, which are other than the advantages (1) to (4) of the first embodiment, will be described.

(5) The drive cam 502 of the second embodiment includes the first to third holding sections 521, 522, 523, which correspond to the most retarded position, the middle position and the most forwarded position, respectively, of the control shaft member 30. Therefore, when the drive force of the motor 20 is stopped, the control shaft member 30 can be held in the corresponding one of the stages in the corresponding one of the axial positions of the control shaft member 30.

(6) In the initial position adjusting process, the stop cam angle $\theta S_1$ is set according to the relative position between the drive apparatus 11 and the extension shaft 35 of the valve lift control system 100 in the first holding section 521, which corresponds to the most retracted position of the control shaft member 30.

In this way, in the process of installing the drive apparatus 11 to the valve lift control system 100, the initial position can be easily adjusted according to the relative position between the control shaft member 30 and the extension shaft 35 without performing the shim adjustment process unlike the prior art technique. Therefore, in comparison to the prior art technique, the working time of the assembling can be reduced to improve the productivity.

In the variable valve mechanism recited in JP3799944B2 (corresponding to US2001/0023674A1), at the time of installing the drive apparatus to the valve lift control system, a reference rotational angle at an axial reference position of a slide gear (a position, at which reference surfaces abut with each other) is sensed and is stored, and a rotational angle of the gear at a stop position is computed based on the reference rotational angle. Furthermore, when the drive force of the motor is stopped, the rotational angle is maintained through use of a self-lock function of a helical spline.

In this method of JP3799944B2 (corresponding to US2001/0023674A1), the range of the reference rotational angle is equal to or more than one rotation)(360°), so that the angle of "±(360×n)°" cannot be distinguished by the rotational angle sensor. Therefore, once the engine is turned off, the stored reference rotational angle cannot be identified. Thus, every time the engine is turned on once again, the reference rotational angle needs to be sensed and stored.

In contrast, in the present embodiment, the stop cam angle $\theta S_1$, which is set through the adjustment of the initial position, is smaller than 360 degrees, so that the rotational angle corresponds to the sensed value of the sensor in one-to-one relationship. As a result, once the rotational angle is sensed in the installation process in the manufacturing, it is not required to sense and store the rotational angle once again regardless of the ON/OFF state of the engine. As a result, the computing load of the ECU 80 at the engine ON time can be reduced, and thereby the risk of erroneous sensing and erroneous computation can be avoided.

(7) The first to third holding sections 521, 522, 523 are set such that the size of the angular range $\Delta\theta_1$, $\Delta\theta_2$, $\Delta\theta_3$ from the minimum cam angle $\theta_{1L}$, $\theta_{2L}$, $\theta_{2L}$ to the maximum cam angle $\theta_{1H}$, $\theta_{2H}$, $\theta_{3H}$ is equally set in each of the first to third holding sections 521, 522, 523, and the amount of change in the profile radius R relative to the amount of change in the cam angle $\theta$ is equally set in the angular range of each of the first to third holding sections 521, 522, 523.

Furthermore, when the drive force of the motor 20 is stopped, the ECU 80 selects the corresponding one of the first to third holding sections 521, 522, 523 of the drive cam 502, which corresponds to the desired axial position of the control shaft member 30. Also, the ECU 80 computes the stop cam angle $\theta S_1$, $\theta S_2$, $\theta S_3$ based on the angular difference $\phi_1$ (=$\phi_2$=$\phi_3$), which is common to all of the holding sections 521, 522, 523.

In this way, regardless of the product-to-product variations of the manufactured drive apparatuses 11, the relative stroke between the most retracted position and the middle position of the control shaft member 30 can be set to the corresponding constant difference $D_1$, and the relative stroke between the middle position and the most forwarded position of the control shaft member 30 can be set to the corresponding constant difference $D_2$.

(8) In the angular range of each of the first to third holding sections 521, 522, 523, the amount of change in the profile radius R relative to the amount of change in the cam angle $\theta$ is equally set, and the profile radius R linearly increases at the predetermined gradient. Therefore, the amount of change in the rotational angle of the drive cam 502 is proportional to the amount of change in the axial position of the control shaft member 30, so that the linear control is made possible.

(9) Furthermore, even in each non-holding section 571, 572, the gradient (slope) of the profile radius R is the same as that of each of the first to third holding sections 521, 522, 523. Therefore, the movement of the control shaft member 30 at each boundary between the corresponding holding section 521, 522, 523 and the corresponding non-holding section 571, 572 is linearly carried out. Furthermore, in response to, for example, the change in the design specification, each of the first to third holding sections 521, 522, 523 can be easily extended or shifted.

Modifications of Second Embodiment

Figure 10A:
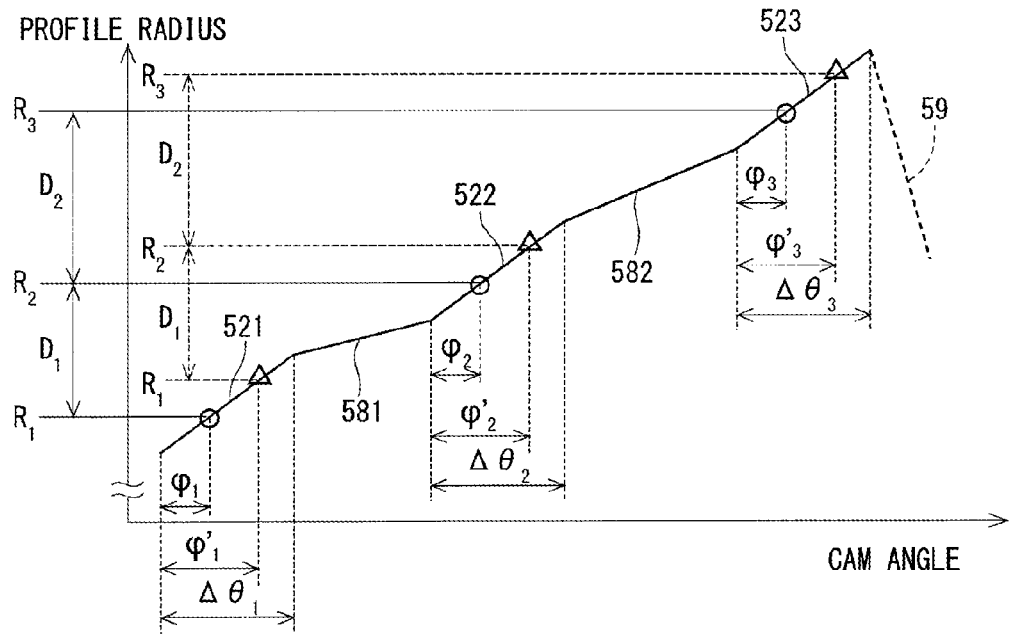
FIG. 10A is a diagram showing a relationship between a cam angle and a profile radius of a drive cam of a first modification of the second embodiment.

Modifications of the second embodiment with respect to the profile radius of the drive cam will be described with reference to FIGS. 10A and 10B.

According to the $\theta$-R correlation line shown in FIG. 9, the gradient (slope) of the profile radius R in each of the first to third holding sections 521, 522, 523 is the same as the gradient (slope) of the profile radius in each of the non-holding sections 571, 572. Alternatively, as shown in FIG. 10A, which indicates the first modification of the second embodiment, the gradient (slope) of the profile radius R in each of the first to third holding sections 521, 522, 523 may be different from the gradient (slope) of the profile radius in each of the non-holding sections 571, 572.

Figure 10B:
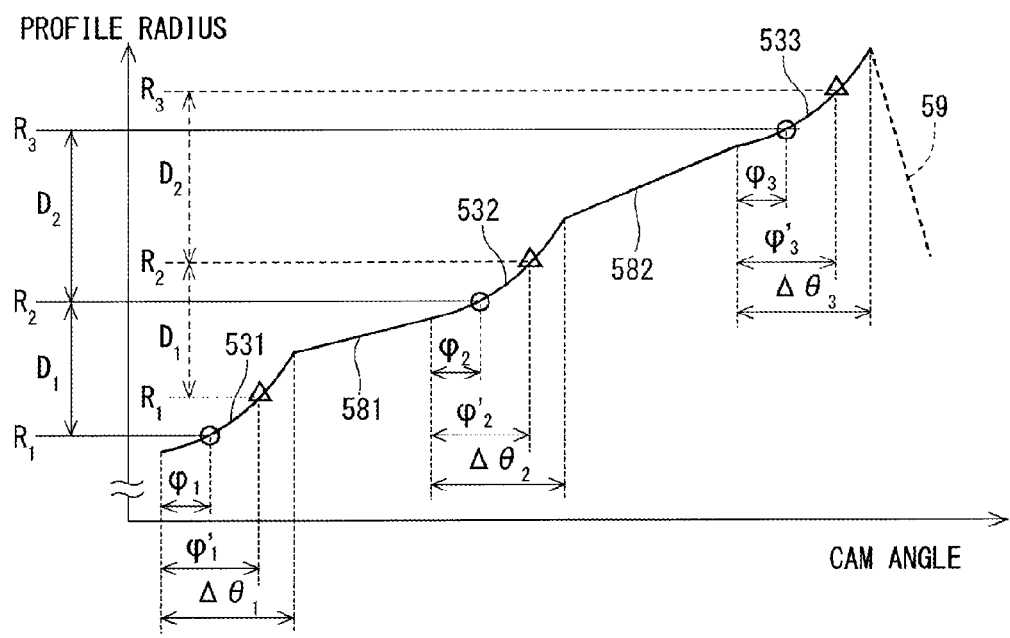
FIG. 10B is a diagram showing a relationship between a cam angle and a profile radius of a drive cam of a second modification of the second embodiment.

Furthermore, as shown in FIG. 10B, which indicates the second modification of the second embodiment, it is only required that the amount of change in the profile radius R relative to the amount of change in the cam angle $\theta$ is equally set in the angular range of each of the first to third holding sections 521, 522, 523, and the change of the value of $dR/d\theta$ is not limited to the linear change and may be a non-linear change, such as a change, which forms a curved line.

Figure 12A:
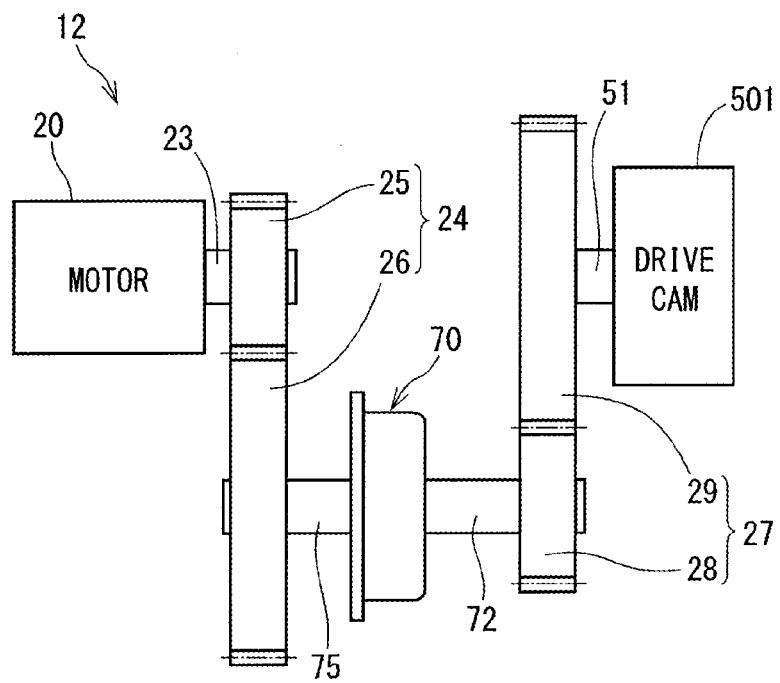
FIG. 12A is a schematic view showing a drive apparatus according to a third embodiment of the present disclosure.
Figure 12B:
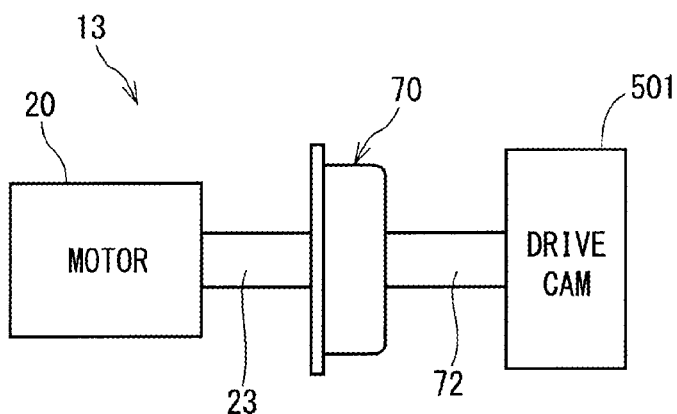
FIG. 12B is a schematic view showing a drive apparatus according to a fourth embodiment of the present disclosure.

Next, the drive apparatus of the third and fourth embodiments will be descried with reference to FIGS. 12A and 12B. The drive apparatus of each of the third and fourth embodiments differs from the drive apparatus of the first embodiment with respect to the location of the reverse input cutoff clutch 70. In the following description, components, which are simi-

Third Embodiment

As shown in FIG. 12A, the drive apparatus 12 of the third embodiment has a speed variable mechanism 24, which is placed between the motor shaft 23 and the input shaft 75 of the reverse input cutoff clutch 70. The rotation of the motor 20 is transmitted to the drive cam 501 through the speed variable mechanism 24, the reverse input cutoff clutch 70 and the speed reducing mechanism 27. In this instance, the reverse input cutoff clutch 70 is placed along a shaft of the gear 26 (forming the input shaft 75 of the input cutoff clutch 70) that is different from the motor shaft 23.

In FIG. 12A, a diameter of a pitch circle of the gear 26, which is placed at the reverse input cutoff clutch 70 side, is depicted to be larger than a diameter of a pitch circle of the gear 25, which is placed at the motor 20 side. The speed of the rotation, which is outputted from the motor 20, is reduced through the speed variable mechanism 24, and this rotation of the reduced speed is transmitted from the speed variable mechanism 24 to the reverse input cutoff clutch 70. Alternatively, the speed variable mechanism 24 may transmit the rotation of the motor 20 at the same speed as that of the rotation of the motor 20 (i.e., the speed variable mechanism 24 may transmit the rotation of the motor 20 without changing the speed of the rotation). Further alternatively, the speed variable mechanism 24 may transmit the rotation of the motor 20 at an increased rotational speed, which is increased in comparison to the rotational speed of the rotation of the motor 20, in a case where the speed variable mechanism 24 transmits the rotation with a speed increasing ratio, which is smaller than a speed reducing ratio of the speed reducing mechanism 27, i.e., in a case where the rotational speed of the drive cam 501 is finally reduced from the rotational speed of the rotation of the motor 20.

The third embodiment provides the advantages discussed in the sections (1) and (2) in the first embodiment.

Fourth Embodiment

As shown in FIG. 12B, the drive apparatus 13 of the fourth embodiment does not have the speed reducing mechanism, and the output-side member 72 of the reverse input cutoff clutch 70 is directly connected to the drive cam 501.

The fourth embodiment provides the advantages discussed in the sections (1) and (3) in the first embodiment. In the case where the return angle of the drive cam 501 does not cause any problem, the number of the components can be reduced, and particularly, the size of the drive apparatus 13 can be reduced.

Other Embodiments (A) In the above embodiments, there is discussed the case, in which the reverse input load Fa is applied from the valve lift control system 100 in the direction of pulling the control shaft member 30. Alternatively, the principle of the present disclosure may be applied to a case where the reverse input load is applied from the valve lift control system 100 in a direction of pushing the control shaft member 30.

(B) The drive source of the present disclosure is not limited to the DC motor of the above embodiments. That is, the drive source may be, for example, another type of electric motor (e.g., an AC motor or any other type) or an actuator, which is operated by hydraulic pressure (oil pressure), compressed air or electromagnetic force.

(C) The specific components of the speed reducing mechanism are not limited to the spur gears. For example, the speed reducing mechanism may have, for example, a bevel gear(s) and/or a planetary gear(s) in addition to or alternative to the spur gear(s).

(D) In the second embodiment, the number of holding sections and the angular ranges of the holding sections of the drive cam may be freely changed.

(E) The mechanism, which adjusts the lift amount at the valve lift control system, is not limited to the above described structure. Furthermore, the valve lift control system is not limited to the one, which adjusts the lift amount of the respective intake valves. That is, the valve lift control system of the present disclosure may be one, which adjusts, for example, the lift amount of the respective exhaust valves.

(F) The drive apparatus of the present disclosure is not necessarily provided in the valve lift control system. That is, the drive apparatus of the present disclosure may be provided in any apparatus or system, which can adjust a controlled variable of a corresponding controlled subject in response to the axial position of the control shaft member.

As discussed above, the present disclosure is not limited the above embodiments and modifications thereof. That is, the above embodiments and modifications thereof may be modified in various ways without departing from the principle of the present disclosure.

What is claimed is:

1. A drive apparatus that adjusts a controlled variable of a controlled subject in response to an axial position of a control shaft member, the drive apparatus comprising:
   a drive source that generates a drive torque;
   a drive cam that is rotated about a camshaft member upon application the drive torque of the drive source to the drive cam, wherein a profile radius of the drive cam, which is a radial distance from a rotational center of the drive cam to an outer peripheral surface of the drive cam, is not uniform in a circumferential direction of the drive cam;
   a transmission device that converts rotational motion of the drive cam into linear reciprocating motion upon rotation of the drive cam and transmits the converted linear reciprocating motion to the control shaft member;
   the control shaft member that is connected to the controlled subject and is linearly reciprocated together with the transmission device in an axial direction upon the rotation of the drive cam; and
   a reverse input cutoff clutch that transmits the drive torque, which is received from the drive source, to the drive cam, wherein the reverse input cutoff clutch non-rotatably locks an output shaft of the drive source in response to a reverser input torque transmitted from the controlled subject through the drive ca;
   the transmission device includes:
      a contact member that is placed on one side of a rotational center of the drive cam in a radial direction, wherein the contact member is urged by the controlled subject and thereby contacts the outer peripheral surface of the drive cam through a contact point; and
      a support member that supports the contact member and is linearly reciprocated in a direction perpendicular to the camshaft member in response to a change in the profile radius of the drive cam at the contact point caused by the rotational motion of the drive cam;

the control shaft member is joined to the support member and is linearly reciprocated together with the support member in the axial direction;

the drive cam includes a plurality of holding sections, wherein a corresponding one of the plurality of holding sections contacts the contact member when a drive force of the drive source is stopped;

the drive apparatus further comprises a controller that controls a stop cam angle of the drive cam relative to a cam angle, which is a rotational angle of the drive cam from a reference axis of the drive cam, when the drive force of the drive source is stopped;

each of the plurality of holding sections is set such that a size of an angular range from a minimum cam angle to a maximum cam angle of the holding section is equally set in each of the plurality of holding sections, and an amount of change in the profile radius relative to an amount of change in the cam angle in the angular range of the holding section is equally set in each of the plurality of holding sections; and the controller sets a corresponding predetermined value as an angular difference, which is a difference from the minimum cam angle to the stop cam angle, in each of the plurality of holding sections, and the corresponding predetermined value corresponds to an individual relative position of the drive apparatus relative to the controlled subject.

2. The drive apparatus according to claim 1, further comprising a speed reducing mechanism that reduces a rotational speed of rotation transmitted from the drive source and transmits the rotation of the reduced rotational speed to the drive cam, wherein the reverse input cutoff clutch is placed between the drive source and the speed reducing mechanism.

3. The drive apparatus according to claim 2, wherein the reverse input cutoff clutch is coaxial with the output shaft of the drive source.

4. The drive apparatus according to claim 1, wherein the drive source is an electric motor.

5. The drive apparatus according to claim 1, wherein the amount of change in the profile radius relative to the amount of change in the cam angle is constant in each of the plurality of holding sections.

* * * * *